W. Weiland.
Picker-Staff for Loom.
N° 49,182. Patented Aug. 1, 1865.
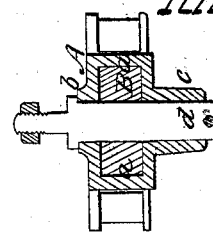
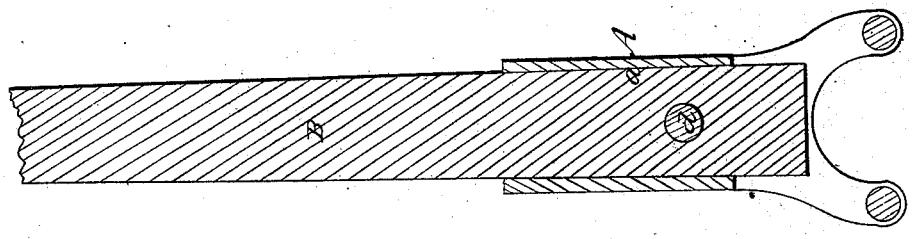
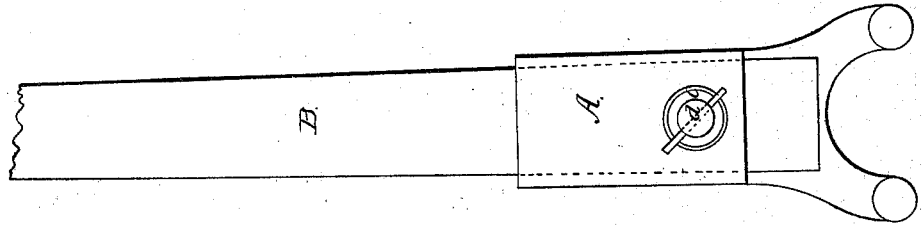
Witnesses:
Frederick Curtis
R. C. Fisher
Inventor:
Warner Weiland
by his attorney
R. H. Eddy

UNITED STATES PATENT OFFICE.

WARNER WEILAND, OF DEDHAM, MASSACHUSETTS.

IMPROVEMENT IN PICKER-STAFF CONNECTIONS IN LOOMS.

Specification forming part of Letters Patent No. 49,182, dated August 1, 1865.

*To all whom it may concern:*

Be it known that I, WARNER WEILAND, of Dedham, in the county of Norfolk and State of Massachusetts, have made a new and useful invention having reference to the Picker-Staff of a Loom; and I do hereby declare the same to be fully described in the following specification and represented in the accompanying drawings, of which—

Figure 1 is a front view; Fig. 2, a vertical section; and Fig. 3, a transverse or horizontal section of a picker-staff and its carrier, as provided with my invention.

The purpose of the improvement is to hold the picker-staff firmly to its carrier, and prevent the staff from being split by its connections with the carrier when in use, an accident which is of frequent occurrence with picker-staves as usually fixed to their carriers.

In carrying out my invention, I form a carrier, A, with a tubular socket, $a$, and with bearings $b$ $c$, so applied to such socket that the pin $d$, on which the picker-staff or its carrier is supported and plays when in use, may pass through such bearings and socket, and also go through the staff, when extending through such socket in the manner as shown in the drawings, wherein the staff is represented at B. The socket is open at both ends, and is bored to receive a bolt or pin, $d$, which, passing through it and also through a corresponding bore in the staff, secures the latter firmly in its position in the socket. By this construction of the socket, the pin $d$ aids in holding the staff in place within the socket, and the socket holds the staff so firmly as to prevent it from splitting in the socket.

With my improvement the staff may be easily applied to or separated from the socket, as circumstances may require.

I claim—

The arrangement, substantially as described, of the picker-staff and the socket, the bearings, and the pin of its carrier.

WARNER WEILAND.

Witnesses:
R. H. EDDY,
F. P. HALE, Jr.